United States Patent
Zhang et al.

(10) Patent No.: US 11,765,148 B2
(45) Date of Patent: Sep. 19, 2023

(54) ESTABLISHING A SECRET SHARED BETWEEN A FIRST COMMUNICATIONS DEVICE AND AT LEAST ONE SECOND COMMUNICATIONS DEVICE

(71) Applicant: Telefonaktiebolaget LM Ericsson (publ), Stockholm (SE)

(72) Inventors: Guoqiang Zhang, Solna (SE); Lars Andersson, Solna (SE); José Araújo, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 326 days.

(21) Appl. No.: 15/769,085

(22) PCT Filed: Oct. 30, 2015

(86) PCT No.: PCT/EP2015/075225
§ 371 (c)(1),
(2) Date: Apr. 18, 2018

(87) PCT Pub. No.: WO2017/071770
PCT Pub. Date: May 4, 2017

(65) Prior Publication Data
US 2018/0302387 A1 Oct. 18, 2018

(51) Int. Cl.
*H04L 9/40* (2022.01)
*H04W 4/21* (2018.01)
(Continued)

(52) U.S. Cl.
CPC .......... *H04L 63/061* (2013.01); *G06K 7/1417* (2013.01); *H04L 9/085* (2013.01);
(Continued)

(58) Field of Classification Search
CPC ........ H04L 63/061; H04L 9/085; H04W 4/21; H04W 4/20; H04W 12/04; G06K 7/1417
See application file for complete search history.

(56) References Cited

U.S. PATENT DOCUMENTS

| | | | |
|---|---|---|---|
| 7,427,926 B2 * | 9/2008 | Sinclair | G06F 3/017 340/4.2 |
| 8,219,028 B1 * | 7/2012 | Flamholz | G06F 3/017 455/41.2 |

(Continued)

FOREIGN PATENT DOCUMENTS

| | | |
|---|---|---|
| CN | 101394271 A | 3/2009 |
| CN | 103532713 A | 1/2014 |

(Continued)

OTHER PUBLICATIONS

Search Query Report from IP.com (performed May 21, 2020).*
(Continued)

*Primary Examiner* — Sharon S Lynch
(74) *Attorney, Agent, or Firm* — SAGE PATENT GROUP (57) ABSTRACT

A method performed by a computing device of establishing a secret shared between a first communications device and at least one second communications device is provided. The method comprises acquiring, using a first means of communication with the first communications device, a first data representation from which the shared secret can be derived. The method further comprises generating a second data representation from the first data representation, from which second data representation the shared secret can be derived. Moreover, the method comprises providing, using a second means of communication, the second communications device with the second data representation, the first means of communication being different from the second means of communication.

23 Claims, 5 Drawing Sheets

(51) Int. Cl.
  *H04W 12/041*  (2021.01)
  *G06K 7/14*  (2006.01)
  *H04L 9/08*  (2006.01)
  *H04W 4/20*  (2018.01)

(52) U.S. Cl.
  CPC .............. *H04W 4/20* (2013.01); *H04W 4/21* (2018.02); *H04W 12/041* (2021.01)

(56) References Cited

U.S. PATENT DOCUMENTS

| | | | |
|---|---|---|---|
| 8,391,786 B2* | 3/2013 | Hodges | H04M 1/72412 455/3.01 |
| 8,670,564 B1 | 3/2014 | Clayton et al. | |
| 8,726,019 B2 | 5/2014 | Paddon et al. | |
| 8,787,575 B2* | 7/2014 | Laaksonen | H04L 63/062 380/270 |
| 8,885,878 B2* | 11/2014 | Pettit | G06F 3/0346 382/103 |
| 9,008,315 B2* | 4/2015 | Lord | H04B 10/11 380/270 |
| 9,209,970 B2* | 12/2015 | Noda | H04L 9/0861 |
| 9,594,919 B2* | 3/2017 | Lee | H04L 63/0861 |
| 9,632,649 B2* | 4/2017 | Pasquero | G06F 3/048 |
| 9,847,976 B2* | 12/2017 | Lord | H04M 1/003 |
| 10,419,912 B2* | 9/2019 | Srivatsa | H04W 12/003 |
| 10,678,904 B2* | 6/2020 | Andrus | H04L 9/0844 |
| 10,788,401 B2* | 9/2020 | Neeley | G06T 11/206 |
| 2004/0192383 A1* | 9/2004 | Zacks | H04W 92/18 455/556.1 |
| 2004/0203381 A1* | 10/2004 | Cahn | H04B 5/02 455/41.2 |
| 2005/0100166 A1* | 5/2005 | Smetters | H04L 63/0492 726/4 |
| 2005/0176418 A1 | 8/2005 | Leib et al. | |
| 2005/0266798 A1* | 12/2005 | Moloney | H04W 12/02 455/410 |
| 2007/0188323 A1* | 8/2007 | Sinclair | G06F 3/017 340/568.1 |
| 2008/0019514 A1 | 1/2008 | Stromberg et al. | |
| 2008/0081666 A1* | 4/2008 | Masera | H04L 67/025 455/557 |
| 2008/0102793 A1 | 5/2008 | Ananthanarayanan et al. | |
| 2008/0195735 A1* | 8/2008 | Hodges | G05B 19/042 709/227 |
| 2009/0046859 A1* | 2/2009 | Bichler | H04L 9/0872 380/259 |
| 2010/0167646 A1* | 7/2010 | Alameh | H04W 12/06 455/41.2 |
| 2010/0199092 A1* | 8/2010 | Andrus | H04L 9/0844 713/171 |
| 2010/0278342 A1* | 11/2010 | Pering | H04L 9/0827 380/270 |
| 2010/0303236 A1* | 12/2010 | Laaksonen | H04L 63/062 380/270 |
| 2011/0117841 A1* | 5/2011 | Thorn | G06F 1/1698 455/41.2 |
| 2013/0022235 A1* | 1/2013 | Pettit | G06F 3/0304 382/103 |
| 2013/0111370 A1* | 5/2013 | Pasquero | G06F 3/1423 715/761 |
| 2013/0169526 A1* | 7/2013 | Gai | G06F 3/04883 345/156 |
| 2013/0169571 A1* | 7/2013 | Gai | G06F 3/03547 345/173 |
| 2013/0282912 A1 | 10/2013 | Yo et al. | |
| 2014/0057676 A1* | 2/2014 | Lord | H04B 10/1141 455/556.1 |
| 2014/0106710 A1* | 4/2014 | Rodriguez | H04M 1/7253 455/411 |
| 2014/0208384 A1 | 7/2014 | Youssefian et al. | |
| 2014/0274173 A1* | 9/2014 | Dharawat | H04M 1/7253 455/500 |
| 2014/0325222 A1* | 10/2014 | Kim | H04L 63/0428 713/168 |
| 2014/0369232 A1 | 12/2014 | Kim et al. | |
| 2014/0370807 A1* | 12/2014 | Lei | H04W 4/80 455/41.2 |
| 2015/0010153 A1* | 1/2015 | Robertson | H04K 3/226 380/270 |
| 2015/0046991 A1* | 2/2015 | Andrus | H04L 9/0844 726/6 |
| 2015/0105111 A1* | 4/2015 | Rodriguez | H04W 4/80 455/466 |
| 2015/0117645 A1* | 4/2015 | Carlson | H04L 63/0435 380/262 |
| 2015/0215292 A1* | 7/2015 | Novicov | H04W 76/15 713/168 |
| 2015/0215295 A1* | 7/2015 | Lord | H04L 63/0428 455/552.1 |
| 2015/0222517 A1* | 8/2015 | McLaughlin | H04W 12/50 713/156 |
| 2015/0223011 A1* | 8/2015 | Yato | H04W 8/005 455/41.2 |
| 2015/0263854 A1* | 9/2015 | Sakumoto | H04L 9/0869 380/44 |
| 2015/0269389 A1* | 9/2015 | Lee | H04L 63/0428 713/164 |
| 2015/0288667 A1* | 10/2015 | Alder | H04L 63/061 713/171 |
| 2015/0334504 A1* | 11/2015 | Donaldson | H04S 7/303 381/307 |
| 2015/0381619 A1* | 12/2015 | Kohlenberg | H04W 12/04 726/7 |
| 2016/0007174 A1* | 1/2016 | Gai | H04W 12/50 345/173 |
| 2016/0054973 A1* | 2/2016 | Gai | G06F 3/041 345/173 |
| 2016/0135245 A1* | 5/2016 | Singh | H04W 12/003 455/41.2 |
| 2016/0360341 A1* | 12/2016 | Srivatsa | H04M 1/7253 |
| 2017/0013104 A1* | 1/2017 | Iinuma | H04M 1/7253 |
| 2017/0078883 A1* | 3/2017 | Rodriguez | H04M 1/72454 |
| 2017/0177291 A1* | 6/2017 | Gai | H04W 4/21 |
| 2017/0337367 A1* | 11/2017 | Andrus | H04L 9/0844 |
| 2018/0176112 A1* | 6/2018 | McLaughlin | H04L 63/061 |
| 2018/0199176 A1* | 7/2018 | Srivatsa | H04W 76/14 |
| 2018/0234847 A1* | 8/2018 | Rodriguez | H04M 1/72412 |
| 2019/0163895 A1* | 5/2019 | Andrus | H04L 9/0844 |
| 2019/0260660 A1* | 8/2019 | Abuan | H04L 67/303 |

FOREIGN PATENT DOCUMENTS

| | | |
|---|---|---|
| CN | 104156066 A | 11/2014 |
| CN | 104685825 A | 6/2015 |
| CN | 104767804 A | 7/2015 |
| JP | 2006-178748 1 | 7/2006 |
| JP | 2010187282 A | 8/2010 |
| JP | 2011101118 A | 5/2011 |
| JP | 2011130224 A | 6/2011 |
| JP | 201468076 A | 4/2014 |
| RU | 2392754 C2 | 6/2010 |
| TW | 201344459 A | 11/2013 |
| WO | 2008075638 A1 | 6/2008 |
| WO | 2009014063 A1 | 1/2009 |
| WO | WO 2012/044395 A1 | 4/2012 |
| WO | 2012091164 A1 | 7/2012 |

OTHER PUBLICATIONS

Search Query Report from IP.com (performed Oct. 14, 2020) (Year: 2020).*

Search Query Report from IP.com (performed Feb. 18, 2021) (Year: 2021).*

Search Query Report from IP.com (performed Aug. 2, 2021) (Year: 2021).*

Office Action for Japanese Patent Application No. 2018-520194 dated Jun. 28, 2019, including English summary, 12 pages.

(56) References Cited

OTHER PUBLICATIONS

International Search Report and Written Opinion of the International Searching Authority for International Application No. PCT/EP2015/075225 dated Jul. 7, 2016, 9 pages.
English Translation of Office Action for Taiwanese Patent Application No. 105130898 dated Jun. 6, 2017, 5 pages.
English Translation of Search Report for Russian Patent Application No. 2018119671/08(030963) dated Jan. 29, 2019, 2 pages.
English Summary of Office Action dated Oct. 15, 2019 for Korean Patent Application No. 2018-7010966, 3 pages.
Office Action dated Jul. 29, 2020 for Brazilian Patent Application No. 112018008715-7, 4 pages.
Office Action dated Feb. 2, 2021 for Chinese Patent Application No. 201580084226.7 including English translation, 9 pages.

* cited by examiner

ESTABLISHING A SECRET SHARED BETWEEN A FIRST COMMUNICATIONS DEVICE AND AT LEAST ONE SECOND COMMUNICATIONS DEVICE

CROSS REFERENCE TO RELATED APPLICATION

This application is a 35 U.S.C. § 371 national stage application of PCT International Application No. PCT/EP2015/075225, filed on Oct. 30, 2015, the disclosure and content of which is incorporated by reference herein in its entirety.

TECHNICAL FIELD

The invention relates to methods of establishing a secret shared between a first communications device and at least one second communications device, and corresponding computing devices. The invention further relates to computer programs for causing computing devices to perform the methods according to the invention, and corresponding computer program products.

BACKGROUND

As regards electronic devices, from a client point-of-view, a user usually needs one desktop for work or leisure. When it comes to other electronic devices, a user may have a few devices, one for each particular application, such as gaming consoles, set-top boxes, smartphones and watches, tablets, network music players, etc.

Further, since the advent of Internet of Things (IoT), a user may have a great number of electronic devices in her home, commonly referred to as Machine-to-Machine (M2M) devices in the form of, e.g., temperature sensors, smart clothes, thermostat controllers, etc.

For instance, a user may wear a smart watch for health monitoring and a head-mounted device (HMD) for entertainment, and at the same time have a smartphone for communicating with the smart watch and the HMD.

As the number of electronic devices increases in daily life, device association, or pairing, will play an important role for data sharing among two or more devices. In many situations, a few electronic devices are required to be connected temporally to exchange information, such as sharing a bill in a restaurant, or sharing a PowerPoint file among the audience for a presentation.

Many different approaches exist for device association or pairing. For instance, a tablet lacking a subscriber identity module (SIM) card may, after having completed an authentication process, set up a local WiFi connection with a smartphone to use to the smartphone as a HotSpot for accessing the Internet.

As another example, the so called "Bump" application initiates pairing of two devices upon a user bumping the two devices together. Then, sensor data from motion and/or acceleration sensors is processed for associating the two devices. Further examples exist where visual tags, such as for instance Quick Response (QR) codes are used for associating many devices; a first device generates and displays a visual tag on its screen, and other devices may then scan the visual tag by using their cameras to join in a group communication. In a further example, U.S. Pat. No. 7,907,901 discloses shaking of two devices, wherein if the two devices are shaken in the same way they will generate identical motion data on the basis of which they subsequently can be paired.

A problem with the approaches utilized in these examples is that the same type of sensors and means of communication must be used among the devices; in the first example, the devices engage in radio communication, in the second and fourth example, orientation sensors are employed, while in the third example, the devices interact by means of visual communication.

SUMMARY

An object of the invention is to solve, or at least mitigate, this problem in the art, and to provide an improved method for facilitating establishment of a secret which is shared between communications devices.

This object is attained in a first aspect of the invention by a method performed by a computing device of establishing a secret shared between a first communications device and at least one second communications device. The method comprises acquiring, using a first means of communication with the first communications device, a first data representation from which the shared secret can be derived. The method further comprises generating a second data representation from the first data representation, from which second data representation the shared secret can be derived. Moreover, the method comprises providing, using a second means of communication, the second communications device with the second data representation, the first means of communication being different from the second means of communication.

This object is attained in a second aspect of the invention by a computing device configured to establish a secret shared between a first communications device and at least one second communications device, which computing device comprises a processing unit and a memory, said memory containing instructions executable by said processing unit, whereby said computing device is operative to acquire, using a first means of communication with the first communications device, a first data representation from which the shared secret can be derived. The computing device is further operative to generate a second data representation from the first data representation, from which second data representation the shared secret can be derived. Moreover, the computing device is operative to provide, using a second means of communication, the second communications device with the second data representation, the first means of communication being different from the second means of communication.

This object is attained in a third aspect of the invention by a method performed by a computing device of establishing a secret shared between a first communications device and at least one second communications device. The method comprises acquiring sensor data from which the shared secret can be derived, the sensor data representing motion which both the computing device and the first communications device are subjected to. The method further comprises generating a second data representation from the sensor data, from which second representation the shared secret can be derived. Moreover, the method comprises providing the second communications device with the second data representation.

This object is attained in a fourth aspect of the invention by a computing device configured to establish a secret shared between a first communications device and at least one second communications device, which computing device comprises a processing unit and a memory, said memory containing instructions executable by said processing unit, and further a motion sensor, whereby said computing device is operative to acquire sensor data of the motion sensor from which the shared secret can be derived. The sensor data represents motion which both the computing device and the first communications device are subjected to. The computing device is further operative to generate a second data representation from the sensor data, from which second representation the shared secret can be derived. Moreover, the computing device is operative to provide the second communications device with the second data representation.

This object is attained in a fifth aspect of the invention by a computer program comprising computer-executable instructions for causing a device to perform steps according to an embodiment of the first and/or third aspect of the invention when the computer-executable instructions are executed on a processing unit included in the device.

This object is attained in a sixth aspect of the invention by a computer program product comprising a computer readable medium, the computer readable medium having the computer program according to the fifth aspect embodied thereon.

Advantageously, with a computing device acting as a relay or proxy for associating a group of devices with each, association of heterogeneous devices, i.e., devices utilizing different means of communication, is made possible.

For instance, in the first aspect of the invention, assuming that a first device in the form of a projector is to be paired/associated with a second device embodied by a conference phone; the projector is equipped with a light source for projecting visual objects, while the conference phone is equipped with a microphone via which it is capable of receiving audio signals.

A user may thus have the projector display a visual tag, such as a Quick Response (QR) code or the like. This may be effected for instance by instructing the projector accordingly by pressing a dedicated button of a remote control associated with the projector, or by having the projector display the QR code upon power-on.

The user thus sets up communication between the projector and the relay device of the invention, being, e.g., a smartphone, using a first means of communication, in this exemplifying embodiment by having the smartphone read the QR code displayed by the projector onto a wall or projection screen, using the smartphone's camera. The read QR code constitutes a first data representation from which a secret shared by the projector and the smartphone can be derived, for instance in the form of a particular binary sequence.

Now, the user subsequently sets up communication between the conference phone and her smartphone via a second means of communication, in this example by transmitting an audio signal which is picked-up by a microphone of the conference phone, in order to provide the shared secret to the conference phone.

Prior to submitting the audio signal, the smartphone generates a second data representation from the acquired first data representation, from which second data representation the shared secret can be derived by the conference phone. Hence, in order to provide the conference phone with data from which the shared secret can be derived, the first data representation is coded into the audio signal which is transmitted to the conference phone. Thereby, the second data representation is generated from which the shared secret (in the form of the above mentioned binary sequence) can be derived by the conference phone.

Advantageously, the smartphone has enabled secure communication between the projector and the conference phone; when the two devices subsequently establish communication via for example Bluetooth, WiFi, or the Internet, etc, they both have access to the shared secret, i.e., the binary sequence used as an example hereinabove, and secure communication can be undertaken.

In the second aspect of the invention, assuming that a first device in the form of a tablet is to be paired/associated with a second device, again embodied by a conference phone; the tablet is equipped with a motion sensor such as an accelerometer, while the conference phone is equipped with a microphone via which it is capable of receiving audio signals.

The user initiates the pairing, e.g., by bumping her smartphone relay device against the tablet, or alternatively by shaking the smartphone together with the tablet. Either way, the motion sensor of the smartphone will produce sensor data from which the shared secret can be derived, the sensor data representing motion which both the smartphone and the tablet are subjected to. The shared secret may be represented by a particular binary sequence.

Similar to the exemplifying embodiment given for the first aspect of the invention, a second data representation from which the shared secret can be derived is generated by the smartphone and provided to the conference phone.

However, in the second aspect, the smartphone generates the second data representation from the acquired sensor data, from which second data representation the shared secret can be derived by the conference phone. Hence, in order to provide the conference phone with data from which the shared secret can be derived, at least a part of the sensor data is coded into the audio signal which is transmitted to the conference phone. Thereby, the second data representation is generated from which the shared secret (in the form of the above mentioned binary sequence) can be derived by the conference phone.

Advantageously, the smartphone has enabled secure communication between of the tablet and the conference phone; when the two devices subsequently establish communication via for example Bluetooth, WiFi, or the Internet, etc, they both have access to the shared secret, i.e. the binary sequence that was created upon bumping or shaking the tablet and the smartphone together, and secure communication can be undertaken.

In an embodiment of the invention, the motion sensor data represents physical contact with the first communications device. Hence, the computing device and the first communications device may advantageously be bumped together to initiate establishment of a shared secret.

In another embodiment of the invention, the motion sensor data represents a movement pattern common with the first communications device. Hence, the computing device and the first communications device may advantageously be shaken together to initiate establishment of a shared secret.

In a further embodiment of the invention, a secret shared between a first communications device and a group of second communications devices is established, in which case the group of second communications device is provided with the second data representation.

In still a further embediment of the invention, at least two of the second communication devices comprised in the group are provided with the second data representation via different means of communication. For instance, one of the second communications devices is provided with the second data representation visually while the other is provided with the second data representation audibly.

In still another embodiment of the invention, the computing device derives the shared secret from the first data representation or the motion sensor data, whichever is applicable, and establishes secure communication with the first communications device and/or the at least one second communications device using the derived shared secret.

In an embodiment, the acquiring of a first data representation from which the shared secret can be derived comprises one of: visually acquiring the first data representation, audibly acquiring the first data representation, and acquiring the first data representation over a wireless radio communication channel.

In another embodiment, the providing of a second data representation from which the shared secret can be derived comprises one of: visually providing the second data representation, audibly providing the second data representation, and providing the second data representation over a wireless radio communication channel.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
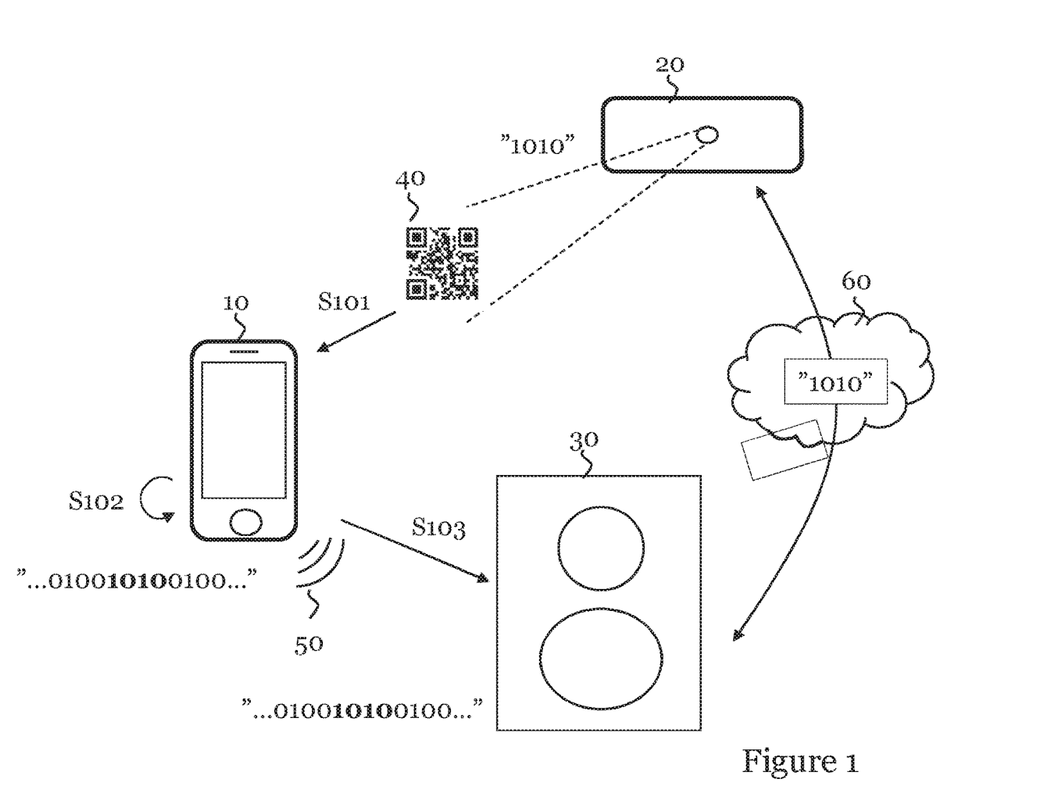
FIG. 1 illustrates a computing device according to an embodiment of the invention, configured to establish a secret shared between a first communications device and at least one second communications device.

FIG. 1 illustrates a computing device 10 according to an embodiment of the invention, configured to establish a secret shared between a first communications device 20 and at least one second communications device 30.

Figure 2:
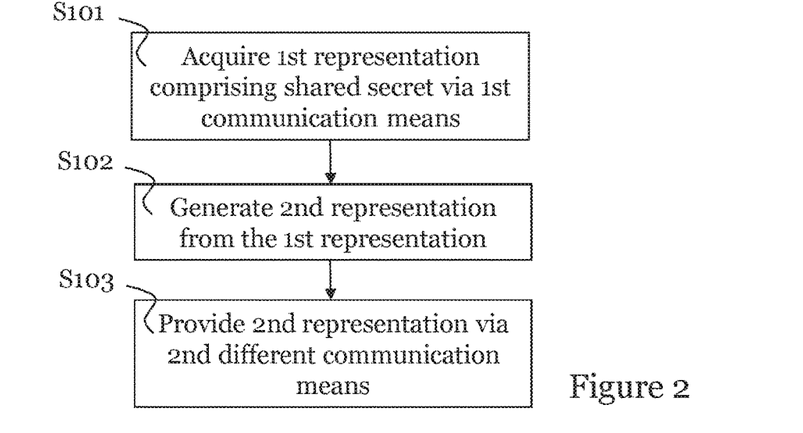
FIG. 2 illustrates a flowchart of an embodiment of a method performed by the computing device of FIG. 1, of establishing a secret shared between the first communications device and the second communications device.

FIG. 2 illustrates a flowchart of an embodiment of a method performed by the computing device 10 of FIG. 1 of establishing a secret shared between the first communications device 20 and the second communications device 30.

The computing device 10 is embodied in the form of a smartphone in FIG. 1, while the first communications device 20 is embodied in the form of a projector and the second communications device 30 in the form of a conference phone.

In order to establish a shared secret between the projector 20 and the conference phone 30 for enabling subsequent secure communication between the two devices, a user may have the projector display a visual tag, in this particular example a QR code 40.

The user will have the smartphone 10 read the QR code 40 by means of a camera in order to acquire a first data representation from which a shared secret can be derived. In the illustration of FIG. 1, the first data representation comprises a binary sequence " . . . 010010100100 . . . " from which the shared secret may be derived. In this particular example, the shared secret is embodied by the 4-bit sequence "1010" interspersed into the first data representation.

In step S102, the mobile phone 10 generates a second data representation from the first data representation, from which second data representation the shared secret can be derived.

In this example, the second data representation is provided to the conference phone 30 from the smartphone 10 via an audio signal 50 picked-up by a microphone of the conference phone 30. Hence, in order to provide the conference phone with data from which the shared secret can be derived, the first data representation is coded into the audio signal 50 which is transmitted to the conference phone 30 in step S103. Thereby, the second data representation is generated from which the shared secret (in the form of the above mentioned 4-bit sequence) can be derived by the conference phone.

Advantageously, the smartphone 10 has enabled secure communication between the projector 20 and the conference phone 30, each communicating with the smartphone 10 by different means of communication. When the two devices subsequently establish communication via for example a local WiFi network 60, they both have access to the shared secret, i.e. the 4-bit sequence "1010", and secure communication can be undertaken.

It should be noted that the shared secret and the first and second data representation may have a different structure than that illustrated with reference to FIG. 1. It should further be noted that establishment of secure communication between the projector 20 and the conference phone 30 may be effected via a device such as a server (not shown) before a secure communication channel can be setup between the two. Moreover, the first and second data representations are illustrated to comprise the 4-bit shared secret interspersed in a longer code. However, it can also be envisaged that the first and second data representation indeed comprises the shared secret only.

Figure 3:
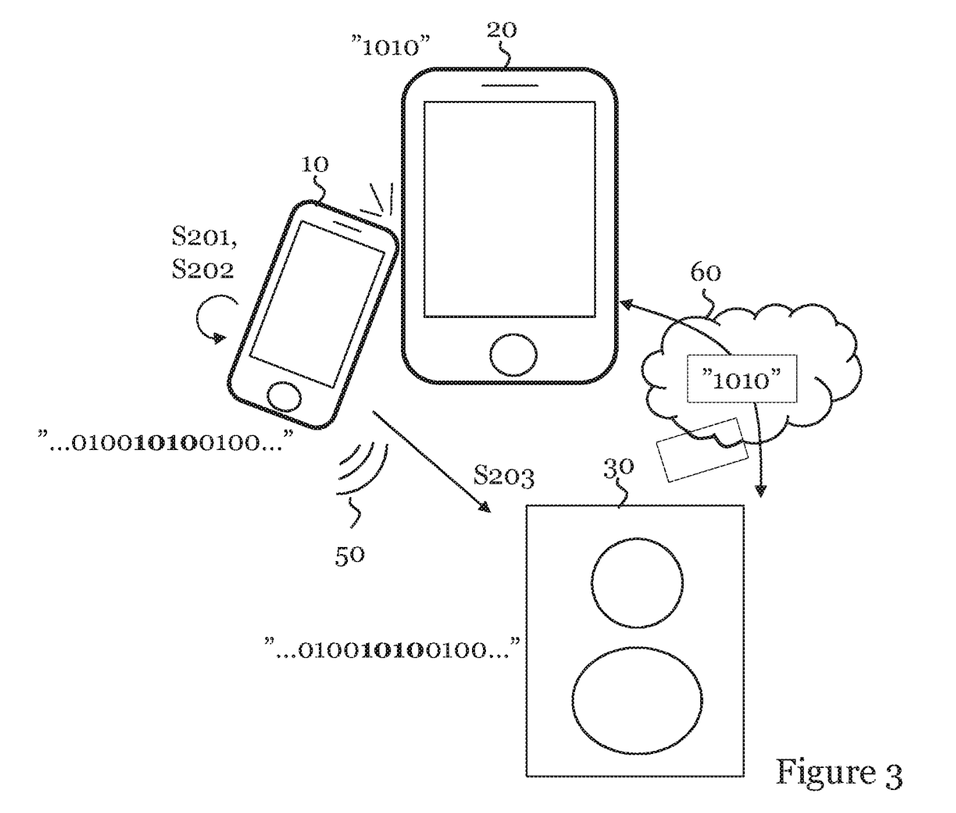
FIG. 3 illustrates a computing device according to another embodiment of the invention, configured to establish a secret shared between a first communications device and at least one second communications device.

FIG. 3 illustrates a computing device 10 according to a further embodiment of the invention configured to establish a secret shared between a first communications device 20 and at least one second communications device 30.

Figure 4:
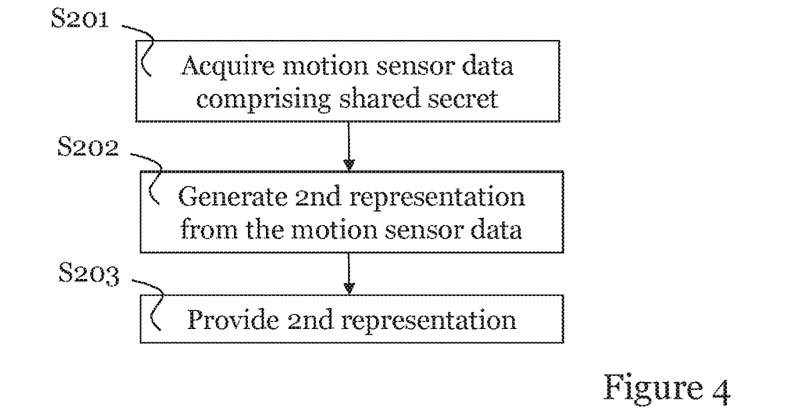
FIG. 4 illustrates a flowchart of an embodiment of a method performed by the computing device of FIG. 3, of establishing a secret shared between the first communications device and the second communications device.

FIG. 4 illustrates a flowchart of an embodiment of a method performed by the computing device 10 of FIG. 3 of establishing a secret shared between the first communications device 20 and the second communications device 30.

Again, the computing device 10 is embodied in the form of a smartphone and the second communications device 30 in the form of a conference phone, while the first communications device 20 in this particular embodiment is embodied by a tablet.

In this embodiment, in order to establish a shared secret between the tablet 20 and the conference phone 30 for enabling subsequent secure communication between the two devices, a user bumps her smartphone 10 against the tablet. A respective inertia measurement unit (IMU) in the smartphone 10 and the tablet 20 will register the motion that the two devices are subjected to. The IMU may be an accelerometer, a gyroscope, a magnetometers or a combination of two or more of these types of motion sensors.

From the motion that the smartphone 10 and the tablet 20 are subjected to, it is possible to conclude whether these exact two devices were bumped together, and a shared secret may thus be established. As previously was mentioned, the motion may be embodied by movement of the smartphone 10 and the tablet according to a common pattern, such as the user holding the two devices in the same hand and shaking them back and forth.

By shaking the two devices, the motion (i.e., accelerations) which the two devices are subjected to are used to generate a secret, such as a key, which key subsequently is used to establish the secure connection. Since the two devices are moved together, they have performed an identical motion, and thus captured substantially identical motion data. From the identical motion data, identical copies of the shared secret may be established.

The smartphone 10 hence acquires sensor data in step S201 from its IMU, from which data the shared secret can be derived. The acquired sensor data represents the bumping motion that the smartphone 10 and the tablet 20 was subjected to. In the illustration of FIG. 3, the sensor data comprises a binary sequence " . . . 010010100100 . . . " from which the shared secret may be derived. In this particular example, the shared secret is embodied by the 4-bit sequence "1010" interspersed into the sensor data.

As in the embodiment previously described with reference to FIG. 1, the smartphone 10 needs to generate a second data representation in a format that can be transmitted to, and interpreted by, the conference phone 30.

In step S202, the mobile phone 10 thus generates a second data representation from the sensor data, from which second data representation the shared secret can be derived.

Again, the second data representation is provided to the conference phone 30 from the smartphone 10 via an audio signal 50 picked-up by a microphone of the conference phone 30. Hence, in order to provide the conference phone with data from which the shared secret can be derived, the sensor data is coded into the audio signal 50 which is transmitted to the conference phone 30 in step S203. Thereby, the second data representation is generated from which the shared secret (in the form of the above mentioned 4-bit sequence) can be derived by the conference phone 30.

Advantageously, the smartphone 10 has enabled secure communication between the tablet 20 and the conference phone 30. When the tablet 20 and the conference phone 30 subsequently establish communication via the WiFi network 60, they both have access to the shared secret, i.e. the 4-bit sequence "1010", and secure communication can be undertaken.

Figure 5:
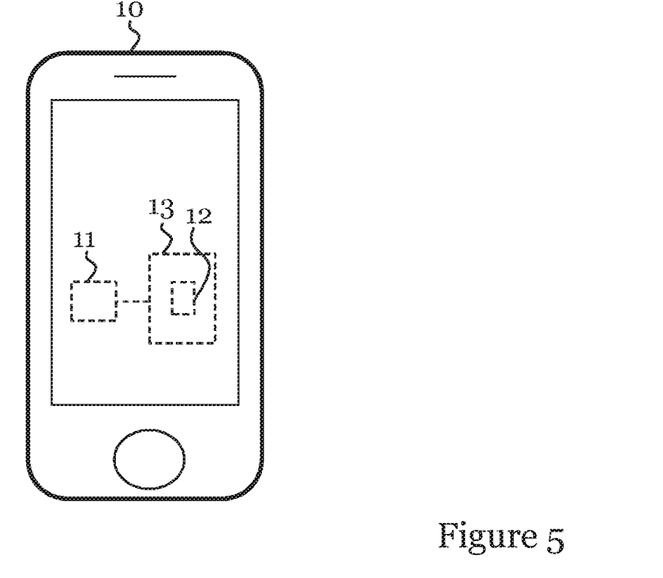
FIG. 5 illustrates a computing device according to an embodiment of the invention.
Figure 6:
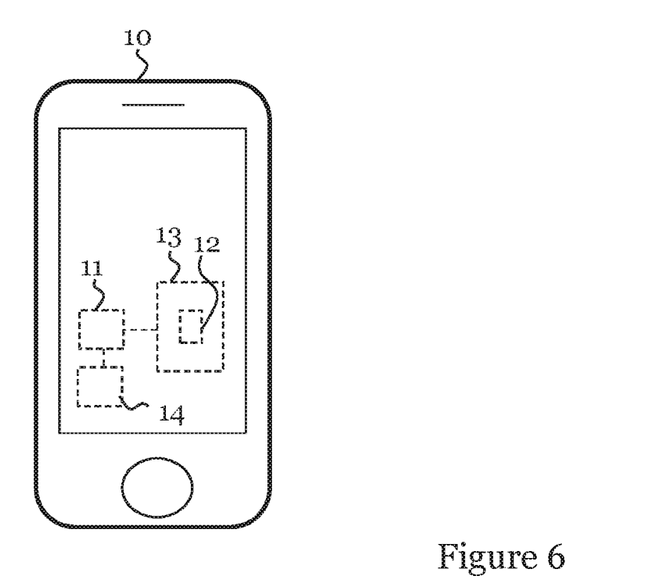
FIG. 6 illustrates a computing device according to another embodiment of the invention.

With reference to FIGS. 5 and 6, the steps of the method performed by the computing device 10 according to embodiments of the invention are in practice performed by a processing unit 11 embodied in the form of one or more microprocessors arranged to execute a computer program 12 downloaded to a suitable storage medium 13 associated with the microprocessor, such as a Random Access Memory (RAM), a Flash memory or a hard disk drive. The processing unit 11 is arranged to cause the computing device 10 to carry out the method according to embodiments of the present invention when the appropriate computer program 12 comprising computer-executable instructions is downloaded to the storage medium 13 and executed by the processing unit 11. The storage medium 13 may also be a computer program product comprising the computer program 12. Alternatively, the computer program 12 may be transferred to the storage medium 13 by means of a suitable computer program product, such as a Digital Versatile Disc (DVD) or a memory stick. As a further alternative, the computer program 12 may be downloaded to the storage medium 13 over a network. The processing unit 11 may alternatively be embodied in the form of a digital signal processor (DSP), an application specific integrated circuit (ASIC), a field-programmable gate array (FPGA), a complex programmable logic device (CPLD), etc.

With reference to FIG. 6, in case motion sensor data is acquired from which the shared secret can be derived, the computing device 10 is equipped with an IMU 14 as previously described. Advantageously, the computing device 10 is embodied by a smartphone, as a smartphone typically is provided with an IMU 14.

Figure 7:
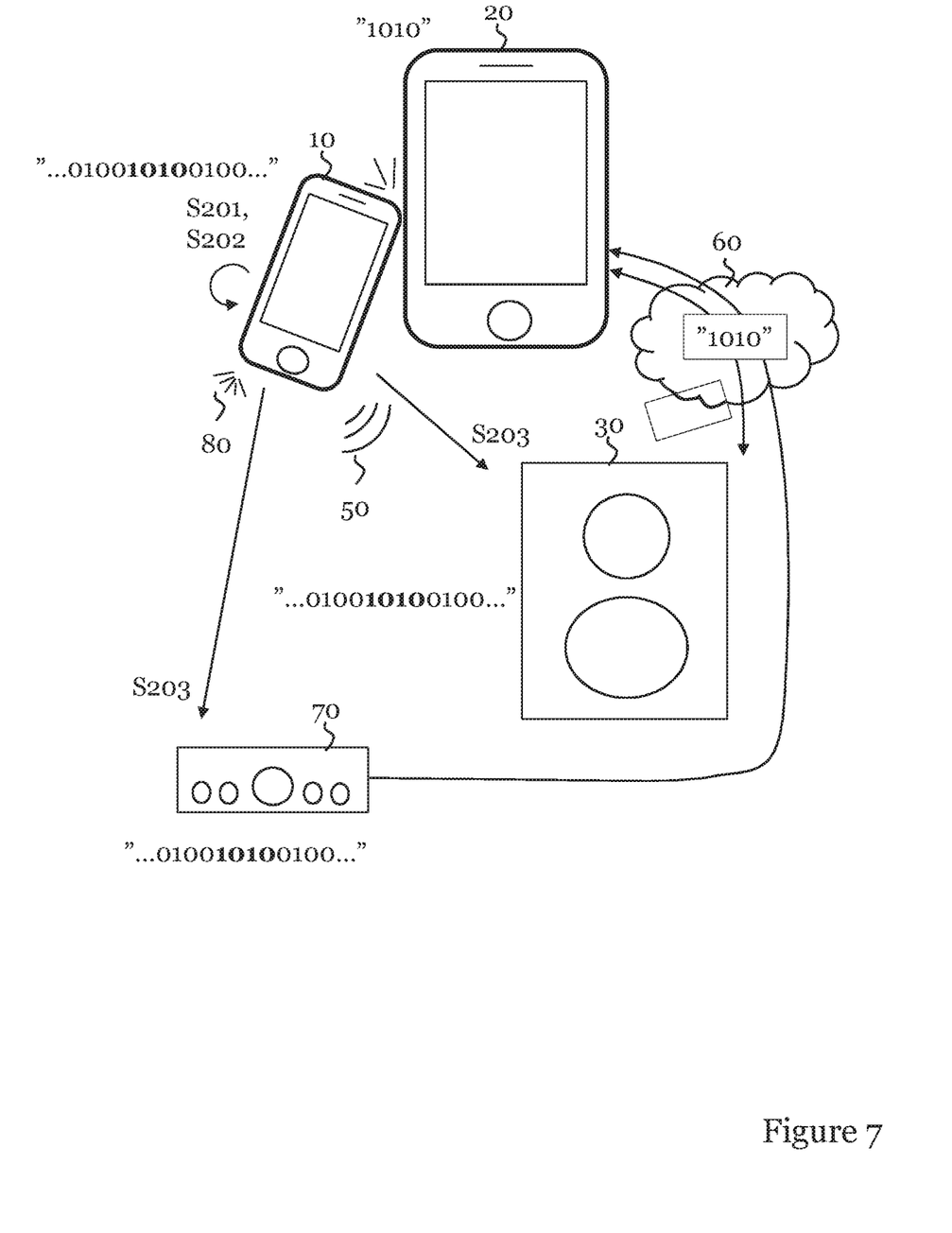
FIG. 7 illustrates a computing device according to a further embodiment of the invention, configured to establish a secret shared between a first communications devices and a group of second communications devices.

FIG. 7 illustrates a computing device 10 according to a further embodiment of the invention, configured to establish a secret shared between tablet 20 and a group of second communications devices, in this exemplifying embodiment the conference phone 30 and a network music player 70 communicating via for instance infrared (IR) signals.

In order to establish a shared secret between the tablet 20 and the conference phone 30 and network music player 70 for enabling subsequent secure communication between the three devices, a user bumps the smartphone 10 against the tablet 20. A respective IMU in the smartphone 10 and the tablet 20 will register the motion that the two devices are subjected to, as was described with reference to FIG. 3.

The smartphone 10 hence acquires sensor data in step S201 from its IMU, from which data the shared secret can be derived. The acquired sensor data represents the bumping motion that the smartphone 10 and the table 20 was subjected to. In the illustration of FIG. 7, the sensor data comprises a binary sequence " . . . 010010100100 . . . " from which the shared secret may be derived. Again, the shared secret is embodied by the 4-bit sequence "1010" interspersed into the sensor data.

In step S202, the mobile phone 10 generates a second data representation from the sensor data, from which second data representation the shared secret can be derived. In case the group of second communications devices had been communicating with the smartphone 10 via the same means of communication, the group of devices could have used the same second data representation.

However, in this exemplifying embodiment, the smartphone 10 needs to generate a second data representation in a format that can be transmitted to, and interpreted by, the conference phone 30 as well as by the network music player 70.

As previously has been described, the second data representation is provided to the conference phone 30 from the smartphone 10 via an audio signal 50 picked-up by a microphone of the conference phone 30. Hence, in order to provide the conference phone with data from which the shared secret can be derived, the sensor data is coded into the audio signal 50 which is transmitted to the conference phone 30 in step S203. Thereby, the second data representation is generated from which the shared secret (in the form of the above mentioned 4-bit sequence) can be derived by the conference phone 30.

Further, the second data representation is provided to the network music player 70 from the smartphone 10 via an IR signal 80 picked-up by an IR sensor of the music player 70. Hence, in order to provide the network music player with data from which the shared secret can be derived, the sensor data is coded into the IR signal 80 which is transmitted to the network music player 70 in step S203, using a suitable protocol. Thereby, the second data representation is generated from which the 4-bit shared secret can be derived by the network music player 70.

In this particular embodiment, the network music player 70 is provided with the second data representation via a third means of communication—in this case IR signals—different from the second means of communication (and the first means of communication), in this case being audio signals. It should be noted that it is envisaged that the means of communication used for supplying the second data representation to the conference phone 30 and the network music player 70 may be the same.

Advantageously, the smartphone 10 has enabled secure communication between the tablet 20 and the conference phone 30 and the music player 70. When the tablet 20 subsequently establishes communication via the WiFi network 60 with the conference phone 30 and the network music player 70, they all have access to the shared secret, i.e. the 4-bit sequence "1010", and secure communication can be undertaken.

It should be noted that the first data representation/sensor data, and subsequently the second data representation, may include information such as identification number of a secure communication session to be established, the allowed duration of the session, geographic location, timestamp, maximum number of devices engaged in the communication, etc.

In a further embodiment of the invention, secure communication channel(s) may be set up between the computing device and the first communications device 20, and possibly with any one or more of the second communications device(s) 30, 70, and the computing device 10 may thus take part in establishing a communication session; the computing device 10 readily has access to the first data representation/sensor data from which the shared secret can be derived.

Figure 8:
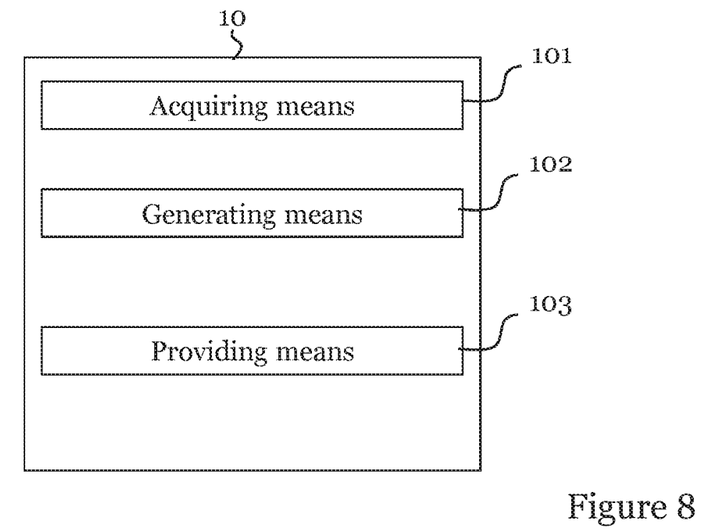
FIG. 8 illustrates a computing device according to an embodiment of the invention.

FIG. 8 illustrates a computing device 10 according to a further embodiment of the invention, configured to establishing a secret shared between a first communications device and at least one second communications device. The computing device 10 comprises acquiring means 101 adapted to acquire, using a first means of communication with the first communications device, a first data representation from which the shared secret can be derived, generating means 102 adapted to generate a second data representation from the first data representation, from which second data representation the shared secret can be derived, and providing means 103 adapted to provide, using a second means of communication, the second communications device with the second data representation, the first means of communication being different from the second means of communication.

The means 101-103 may comprise a communications interface for receiving and providing information, and further a local storage for storing data, and may (in analogy with the description given in connection to FIG. 5) be implemented by a processor embodied in the form of one or more microprocessors arranged to execute a computer program downloaded to a suitable storage medium associated with the microprocessor, such as a RAM, a Flash memory or a hard disk drive.

Figure 9:
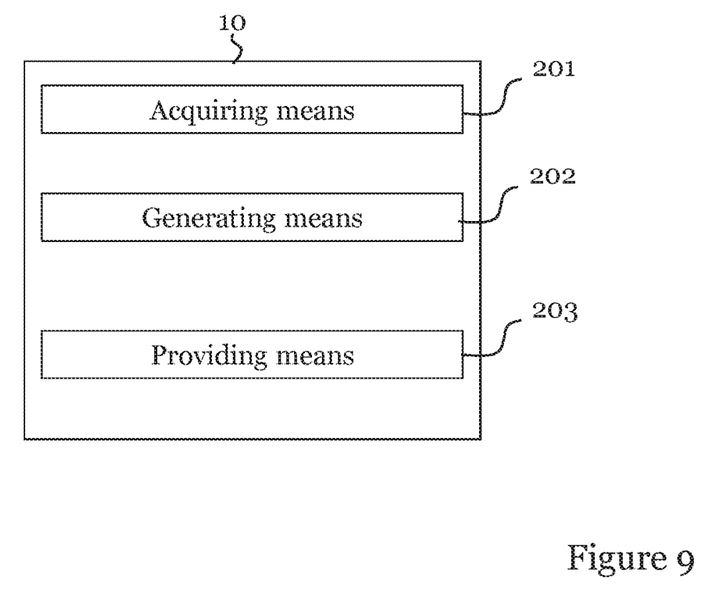
FIG. 9 illustrates a computing device according to another embodiment of the invention.

FIG. 9 illustrates a computing device 10 according to a further embodiment of the invention, configured to establishing a secret shared between a first communications device and at least one second communications device. The computing device 10 comprises acquiring means 201 adapted to acquire sensor data from which the shared secret can be derived, the sensor data representing motion which both the computing device and the first communications device are subjected to, generating means 202 adapted to generate a second data representation from the sensor data, from which second representation the shared secret can be derived, and providing means 203 adapted to provide the second communications device with the second data representation.

The means 201-203 may comprise a communications interface for receiving and providing information, and further a local storage for storing data, and may (in analogy with the description given in connection to FIG. 6) be implemented by a processor embodied in the form of one or more microprocessors arranged to execute a computer program downloaded to a suitable storage medium associated with the microprocessor, such as a RAM, a Flash memory or a hard disk drive.

The disclosure has mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method, performed by a computing device, of establishing a secret shared between a first communications device and a second communications device, the method comprising:

acquiring sensor data representing motion which both the computing device and the first communications device are subjected to;

generating one of a visual or audio representation of the motion which both the computing device and the first communications device are subjected to based on the sensor data; and establishing the secret shared between the first communications device and the second communications device by one of visually or audibly providing the second communications device with the one of the visual and audio representation of the motion which both the computing device and the first communications device are subjected to, from which the second communication device can derive the shared secret, wherein the establishing of the shared secret comprises the computing device either providing the visual representation of the motion coded for acquiring by a camera of the second communications device or providing the audio representation of the motion coded for pick-up by a microphone of the second communications device.

2. The method according to claim 1, wherein the sensor data represents physical contact between the computing device and the first communications device.

3. The method according to claim 1, wherein the sensor data represents a movement pattern the computing device has in common with the first communications device.

4. The method according to claim 1, further comprising:
one of visually or audibly providing a group of second communications devices with the one of the visual and audio representation of the motion which both the computing device and the first communications device are subjected to from which the group of second communications devices can derive the shared secret.

5. The method according to claim 4, wherein one of visually or audibly providing the group of second communication devices with the one of the visual and audio representation of the motion which both the computing device and the first communications device are subjected to comprises one of visually or audibly providing, to at least two communication devices of the group of second communication devices, the one of the visual and audio representation of the motion which both the computing device and the first communications device are subjected to via different means of communication available to the computing device.

6. The method according to claim 1, further comprising:
deriving the shared secret from one of the sensor data or one of the visual or audio representation of the motion which both the computing device and the first communications device are subjected to; and
establishing secure communications with at least one of the first communications device and the second communications device using the derived shared secret.

7. The method according to claim 1, wherein the one of visually or audibly providing the second communications device with the one of the visual or audio representation of the motion which both the computing device and the first communications device are subjected to from which the second communication device can derive the shared secret comprises one of:
visually providing, to the second communication device, a visual representation of the motion which both the computing device and the first communications device are subjected to; or
audibly providing, to the second communication device, an audio representation of the motion which both the computing device and the first communications device are subjected to.

8. A computer program product comprising a non-transitory computer readable medium storing computer-executable instructions executable by a processor of a computing device configured to establish a secret shared between a first communications device and a second communications device, the computer-executable instructions when executed by the processor causes the processor to perform operations comprising:
acquiring sensor data representing motion which both the computing device and the first communications device are subjected to;
generating one of a visual or audio representation of the motion which both the computing device and the first communications device are subjected to based on the sensor data; and
establishing the secret shared between the first communications device and the second communications device by one of visually or audibly providing the second communications device with the one of the visual and audio representation of the motion which both the computing device and the first communications device are subjected to, from which the second communication device can derive the shared secret, wherein the establishing of the shared secret comprises the process of the computing device either providing the visual representation of the motion coded for acquiring by a camera of the second communications device or providing the audio representation of the motion coded for pick-up by a microphone of the second communications device.

9. A computing device configured to establish a secret shared between a first communications device and a second communications device, the computing device comprises a processor and a memory, said memory containing instructions executable by said processor, and a motion sensor, whereby said computing device is operative to:
acquire sensor data representing motion which both the computing device and the first communications device are subjected to;
generate one of a visual or audio representation of the motion which both the computing device and the first communications device are subjected to based on the sensor data; and
establish the secret shared between the first communications device and the second communications device by one of visually or audibly providing the second communications device with the one of the visual and audio representation of the motion which both the computing device and the first communications device are subjected to, from which the second communication device can derive the shared secret, wherein the establishing of the shared secret comprises the computing device either providing the visual representation of the motion coded for acquiring by a camera of the second communications device or providing the audio representation of the motion coded for pick-up by a microphone of the second communications device.

10. The computing device according to claim 9, wherein the sensor data represents physical contact between the computing device and the first communications device.

11. The computing device according to claim 9, wherein the sensor data represents a movement pattern the computing device has in common with the first communications device.

12. The computing device according to claim 9, further being operative to:
one of visually or audibly provide a group of second communications devices with the one of the visual and audio representation of the motion which both the computing device and the first communications device are subjected to from which the group of second communication devices can derive the shared secret.

13. The computing device according to claim 12, wherein at least two communication devices of the group of second communication devices are one of visually or audibly provided with the one of the visual and audio representation of the motion which both the computing device and the first communications device are subjected to via different means of communication available to the computing device.

14. The computing device according to claim 9, further being operative to:
   derive the shared secret from one of the sensor data or one of the visual or audio representation of the motion which both the computing device and the first communications device are subjected to; and
   establish secure communications with at least one of the first communications device and the second communications device using the derived shared secret.

15. The computing device according to claim 9, wherein the one of visually or audibly providing the second communications device with the one of the visual or audio representation of the motion which both the computing device and the first communications device are subjected to from which the second communication device can derive the shared secret comprises one of:
   visually providing, to the second communications device, a visual representation of the motion which both the computing device and the first communications device are subjected to; or
   audibly providing, to the second communications device, an audio representation of the motion which both the computing device and the first communications device are subjected to.

16. The computing device according to claim 15, further comprising one or more of a conference phone, a display, an optical transmitter, and a radio frequency transmitter, in order to one of visually or audibly provide, to the second communication device, one of said visual or audio representation of the motion which both the computing device and the first communications device are subjected to.

17. The method according to claim 1,
   wherein the second communications device is not subjected to the motion the computing device and the first communication device are subjected to.

18. The method according to claim 1, further comprising:
   generating an audio representation of the motion which both the computing device and the first communications device are subjected to based on the sensor data;
   generating a visual representation of the motion which both the computing device and the first communications device are subjected to based on the sensor data;
   establishing the secret shared between the first communications device and the second communications device by visually providing the second communications device with the visual representation of the motion which both the computing device and the first communications device are subjected to, from which the second communication device can acquire by the camera to derive the shared secret; and
   establishing another secret shared between the first communications device and a third communications device by audibly providing the third communications device with the audio representation of the motion which both the computing device and the first communications device are subjected to, from which the third communication device can pick-up by a microphone of the third communication device to derive the another shared secret.

19. The method according to claim 1, further comprising:
   generating an audio representation of the motion which both the computing device and the first communications device are subjected to based on the sensor data;
   generating an infrared (IR) representation of the motion which both the computing device and the first communications device are subjected to based on the sensor data;
   establishing the secret shared between the first communications device and the second communications device by audibly providing the second communications device with the audio representation of the motion which both the computing device and the first communications device are subjected to, from which the second communication device can derive the shared secret; and
   establishing another secret shared between the first communications device and a third communications device by providing through IR signaling to the third communications device the IR representation of the motion which both the computing device and the first communications device are subjected to, from which the third communication device can derive the another shared secret.

20. The computer program product according to claim 8, wherein the computer-executable instructions when executed by the processor cause the processor to perform further operations comprising:
   generating an audio representation of the motion which both the computing device and the first communications device are subjected to based on the sensor data;
   generating a visual representation of the motion which both the computing device and the first communications device are subjected to based on the sensor data;
   establishing the secret shared between the first communications device and the second communications device by visually providing the second communications device with the visual representation of the motion which both the computing device and the first communications device are subjected to, from which the second communication device can acquire by the camera to derive the shared secret; and
   establishing another secret shared between the first communications device and a third communications device by audibly providing the third communications device with the audio representation of the motion which both the computing device and the first communications device are subjected to, from which the third communication device can pick-up by a microphone of the third communication device to derive the another shared secret.

21. The computer program product according to claim 8, wherein the computer-executable instructions when executed by the processor cause the processor to perform further operations comprising:
   generating an audio representation of the motion which both the computing device and the first communications device are subjected to based on the sensor data;
   generating an infrared (IR) representation of the motion which both the computing device and the first communications device are subjected to based on the sensor data;
   establishing the secret shared between the first communications device and the second communications device by audibly providing the second communications device with the audio representation of the motion which both the computing device and the first communications device are subjected to, from which the second communication device can derive the shared secret; and establishing another secret shared between the first communications device and a third communications device by providing through IR signaling to the third communications device the IR representation of the motion which both the computing device and the first communications device are subjected to, from which the third communication device can derive the another shared secret.

22. The computing device according to claim 9 further operative to:
generate an audio representation of the motion which both the computing device and the first communications device are subjected to based on the sensor data;
generate a visual representation of the motion which both the computing device and the first communications device are subjected to based on the sensor data;
establish the secret shared between the first communications device and the second communications device by visually providing the second communications device with the visual representation of the motion which both the computing device and the first communications device are subjected to, from which the second communication device can acquire by the camera to derive the shared secret; and
establish another secret shared between the first communications device and a third communications device by audibly providing the third communications device with the audio representation of the motion which both the computing device and the first communications device are subjected to, from which the third communication device can pick-up by a microphone of the third communication device to derive the another shared secret.

23. The computing device according to claim 9 further operative to:
generate an audio representation of the motion which both the computing device and the first communications device are subjected to based on the sensor data;
generate an infrared (IR) representation of the motion which both the computing device and the first communications device are subjected to based on the sensor data;
establish the secret shared between the first communications device and the second communications device by audibly providing the second communications device with the audio representation of the motion which both the computing device and the first communications device are subjected to, from which the second communication device can derive the shared secret; and
establish another secret shared between the first communications device and a third communications device by providing through IR signaling to the third communications device the IR representation of the motion which both the computing device and the first communications device are subjected to, from which the third communication device can derive the another shared secret.

* * * * *